Oct. 28, 1969  H. L. MOWBRAY ET AL  3,474,869
PLOW TRAILED SECTIONAL HARROW
Filed Nov. 14, 1967  2 Sheets-Sheet 2
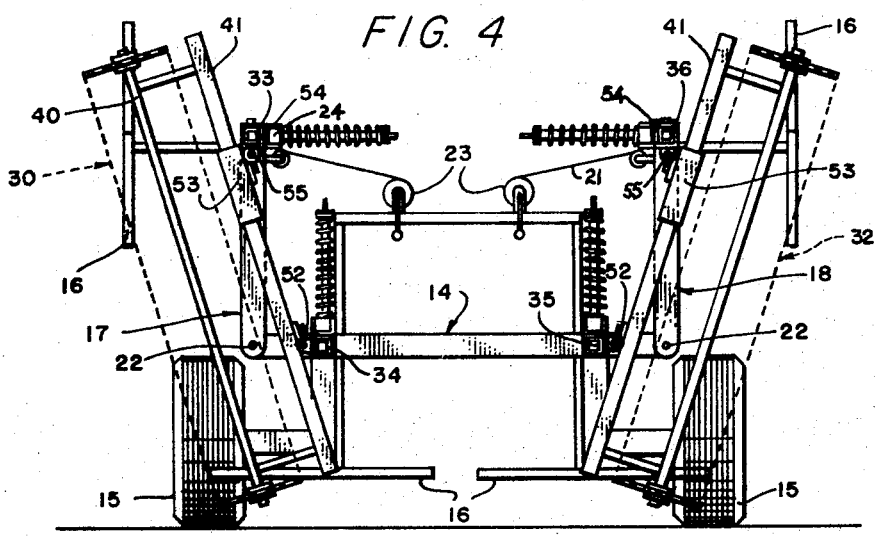
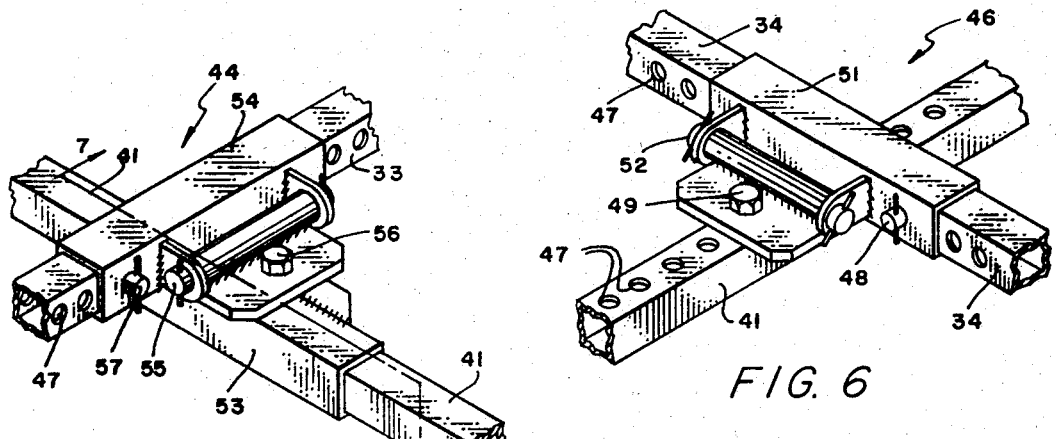
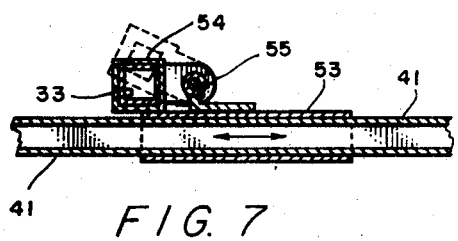
INVENTOR.
HARRY L. MOWBRAY
LEE R. MOWBRAY
BY Hubert Miller
ATTORNEY

United States Patent Office 3,474,869
Patented Oct. 28, 1969

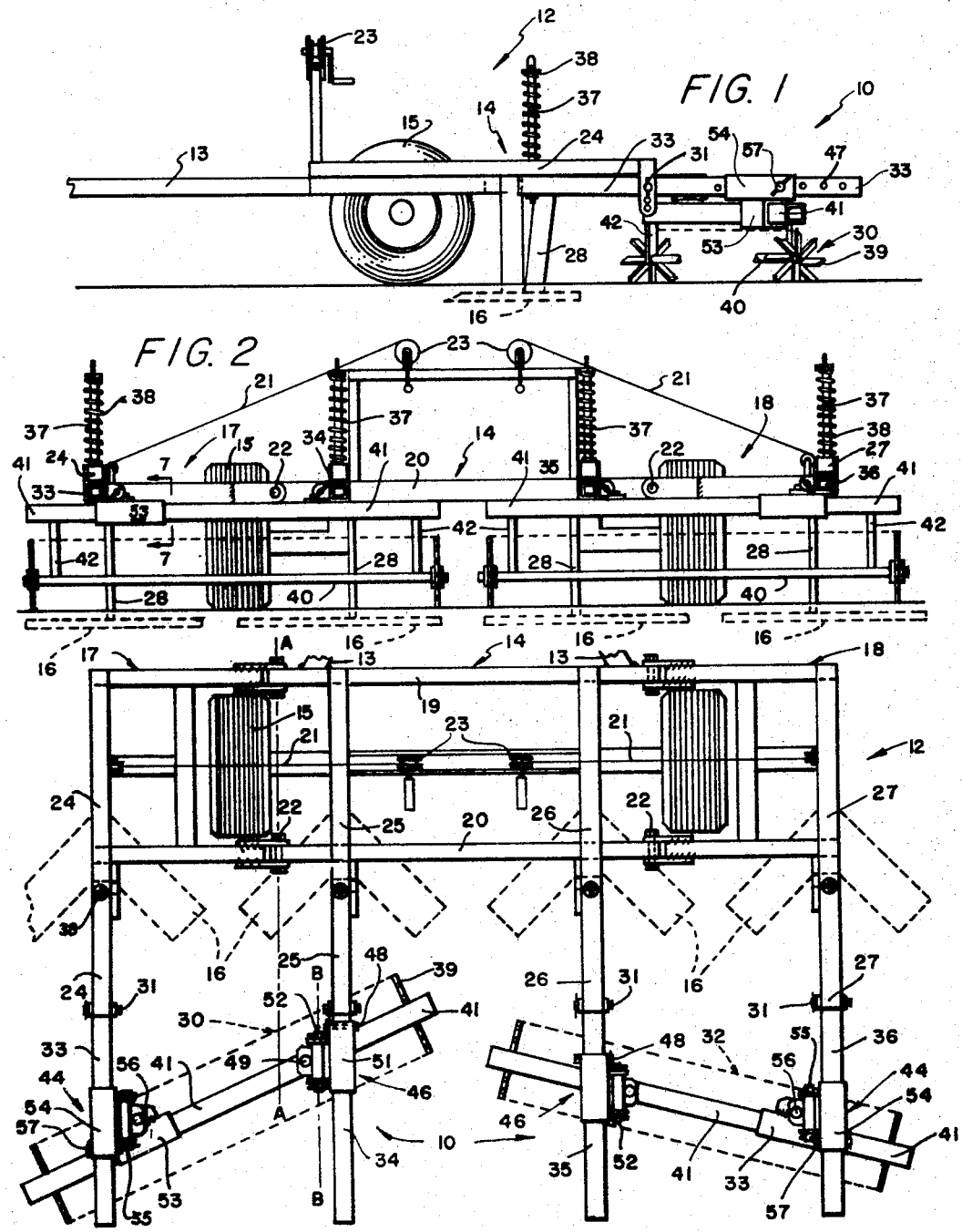

3,474,869
PLOW TRAILED SECTIONAL HARROW
Harry L. Mowbray and Lee R. Mowbray, both of
P.O. Box 124, Medford, Okla. 73759
Filed Nov. 14, 1967, Ser. No. 682,751
Int. Cl. A01b 3/46, 17/00, 5/04
U.S. Cl. 172—177                    4 Claims

ABSTRACT OF THE DISCLOSURE

A novel connecting linkage between two elongated juxtaposed normally co-planar members, respective adjacent ends of which are pivoted on separate and independent axes which are parallel but offset transversely with respect to each other, such linkage permitting and causing the two members to pivot freely in unison about their respective offset axes when either member is pivoted, such linkage also affording changes in relative angular disposition of the members in their common plane without interference with their free movement about their respective pivot axes.

More particularly the invention relates to a rotary harrow type tillage implement specifically suited for stubble mulch farming. In certain parts of the country where wind and water erosion have become a problem, the above mentioned method of farming has become prevalent. Also commonly known as "crop residue management," the method involves tilling or working the ground immediately below the surface while leaving the stubble or residue of the previously harvested crop on the surface with as little disturbance as possible. This residue remaining after harvest forms a cover for the top soil which protects against wind and water erosion and also conserves moisture in the soil.

One type of implement which performs this task is a gang of sweep plows. This type of plow entails a wide horizontal V-shaped blade which passes through the ground immediately below the surface cutting the roots and loosening the top soil without moving the stubble out of place or turning it under. Since this type of plow can be drawn with less resistance than the conventional moldboard plow, it can be arranged in gang form with foldable laterally extending wing sections giving it an exceptionally wide swath. The harrow of this invention, when drawn by plow, further tills the soil for seeding, with a plurality of spiked-tooth wheels arranged in a bank and longitudinally spaced on a shaft. As the wheels pass over the soil, the teeth pierce the trash or stubble layer to effectively till the soil, yet do not appreciably diminish the amount of crop residue at the surface.

The present invention accomplishes the previously mentioned tillage operation with two pivotally mounted harrow sections having a total lateral length equal to the overall length of a three section plow. Two of the plow sections are foldable extensions of the main plow section, while the two harrow sections are also pivotally connected to the main plow section. The longer harrow sections are also connected to the shorter folding plow sections by a slidable linkage, so that both can be rotated together to the raised traveling position by a single operator.

It is therefore the principal object of the present invention to provide a new improved sectional tillage implement.

Another object of the invention is to provide an improved rigid frame mount for separate sections of a rotary harrow which spring biases the harrow sections into engagement with the ground so that each section can rise and fall with the variations in the level of the ground.

Another object is to provide a rigid frame mount which allows the separate harrow sections to be angularly adjusted with respect to the line of draft of the implement, to produce the desired ground working effect.

Still another object of the invention is to provide a two section harrow for trailing attachment to a three section plow, the two sections of the harrow being so constructed and so mounted to the plow sections that they are raised simultaneously with the two outer plow sections to reduce road width.

A broad object of the invention is to provide a novel connecting linkage between two co-planar members which are pivoted about two separate axes which are parallel and offset with respect to each other, the linkage being so constructed as to enable the two members to pivot together about their respective axes.

The invention will be more clearly understood when the following description is read in connection with the accompanying drawings, in which:

FIG. 1 is a side elevation view of a three section plow with a two section rotary harrow attachment, which is the subject matter of the present invention;

FIG. 2 is a rear elevation view of the combined plow and harrow unit illustrating the respective foldable sections in ground working position;

FIG. 3 is a plan view of the combined tillage unit showing the two harrow sections in different angular positions relative to the line of draft of the implement;

FIG. 4 is a rear elevation view of the combined tillage unit illustrating the respective foldable sections in raised or retracted position;

FIG. 5 is an enlarged fragmentary perspective view of a coupling for connecting the outer end of a harrow section to the plow frame;

FIG. 6 is a similar enlarged fragmentary perspective view of a coupling for connecting the inner end of a harrow section to the plow frame; and FIG. 7 is a sectional view taken along line 7—7 of FIG. 5.

Referring now to the drawings and more specifically to FIG. 1, the harrow attachment unit of the present invention generally identified by reference numeral 10, is illustrated attached to a rigid frame sectional plow 12. The plow 12 is pulled by a tractor through a conventional tongue 13 which is integrally attached to the frame or main section 14. The plow 12 and harrow attachment 10 are supported by a pair of wheels 15 which can be moved up or down relative to the frame 14 to position the plow blades 16 and harrow sections 30 and 32 (FIG. 3) with the ground. Since the wheel positioning structure is conventional and not a part of the invention, it is not shown in detail in the drawings.

The plow 12 is a sectional type, having a main section 14 (FIG. 2) and two foldable wing sections 17 and 18, which are pivotally connected to the transverse frame members 19 and 20 of the main section 14 by pins 22. The plow wing sections 17 and 18, as seen in FIG. 2, can be retracted to the FIG. 4 position by hand actuated reels 23 and cables 21 when the implement is being transported. The plow blades 16 are integrally attached to the frame members 24, 25, 26 and 27 (FIG. 3) through upstanding box section brace members 28 (FIG. 2). The frame members 24, 25, 26 and 27 extend rearwardly to provide a mounting base for a trailing implement, in this case the rotary harrow sections 30 and 32, hereafter described.

The harrow attachment 10 which incorporates the present invention, includes two sections of rotary spiked-tooth harrows 30 and 32 angularly mounted on four extension members 33, 34, 35 and 36 (FIG. 3). The extension members are pivotally mounted for movement in a vertical plane to corresponding plow frame members 24, 25, 26 and 27, by pins 31. This pivotal connection allows the harrow sections 30 and 32 to move up and down with changes in contour of the ground. Attached to the left or forward end of extension member 33, as viewed in FIG. 1, is a vertical rod 37 which passes through an opening in plow frame member 24. A compression spring 38, attached to the upper end of rod 37, resists any counterclockwise rotation of extension member 33, thereby maintaining the harrow sections 30 and 32 in spring biased contact with the ground. Each of the harrow extension members is fitted with a like rod and spring arrangement.

Each of the harrow sections 30 and 32 is made up of a series of wheels having radially spaced ground engaging teeth 39. Each series of wheels, illustrated in dotted lines, freely rotates on an axle 40 (FIG. 2) which is suspended from an elongated transversely disposed frame member 41 by a pair of upright spacer members 42 near each end of the axle, as seen in FIG. 2. Each of the harrow sections 30 and 32 is rigidly mounted on two of the extension members 33–34 and 35–36 by a pair of couplings 44 and 46, which are shown in detail in FIGS. 5 and 6. Each coupling is mounted on its respective pair of extension members for longitudinal adjustment thereon to vary the angular position of the harrow sections with respect to the line of draft of the plow. For example, in FIG. 3, harrow section 32 is positioned at a different angle to the line of draft than section 30.

In referring to FIG. 6, it is seen that extension member 34 and transverse harrow frame member 41 have similar box-shaped cross sections. Longitudinally spaced at intervals on each frame member 41 and extension member 34 are a series of holes 47 which are engaged by a locking pin 48 or a bolt 49. Coupling 46 includes a box-shaped sleeve 51 which permits the coupling to slide freely on extension member 34 when locking pin 48 is removed. The coupling 46 allows the harrow frame member 41 to pivot freely in a vertical plane about pin 52 journaled on sleeve 51. Member 41 also may pivot in a horizontal plane about bolt 49. The coupling thereby allows three separate types of movement between members 34 and 41.

Referring to FIG. 5, the coupling 44 includes box sleeves 54 and 53 pivotally attached to each other by fore and aft disposed pivot pin 55, and vertically disposed bolt 56, thereby permitting two way pivoting as described in connection with coupling 46. Sleeve 54 permits the coupling to slide fore and aft on extension member 33 except when locking pin 57 is in place. Member 41 may slide freely within sleeve 53 at all times, as further illustrated in FIG. 7.

OPERATION

As previously stated, the angular position of the harrow sections 30 and 32 with respect to the line of draft determines the tillage effect on the soil surface. To increase the tillage effect of harrow section 30 for example, pin 57 is removed and coupling 44 is moved aft on extension member 33, causing the section to rotate slightly in a counterclockwise direction about pin 49 (FIG. 3). As section 30 continues to rotate, the relative distance between couplings 44 and 46 increases. This increase in spacing is permitted because the sleeve 53 is free to slide outward on frame member 41. The angular position of harrow section 30 can also be adjusted by removing pin 48 and sliding coupling 46 forward or aft on extension member 34.

With the plow wing sections 17 and 18 in extended or ground work position, as seen in FIGS. 2 and 3, the plow 12 is in its maximum width configuration, and the harrow sections are in position for engaging the soil. When it is desired to transport the composite implement, the plow wing and harrow sections 17–18 and 30–32 are folded upward to the respective positions shown in FIG. 4. This is accomplished by winding cables 21 on reels 23. Plow sections 17 and 18 rotate on pivot pins 22 to a vertical position. Since the plow wing sections 17 and 18 are connected to the harrow sections through extension members 33 and 36, the harrow sections 30 and 32 are forced to simultaneously rotate about their pivot pins 52. By reason of the laterally offset axes of rotation 22 of the plow wing sections, and 52 of the harrow sections, it is necessary that a sliding joint exist between frame members 41 and couplings 44 to allow the two sections to rotate together. In rotating from the FIG. 2 position to the FIG. 4 position, the distance between extension members 33 and 34 decreases. This decrease in spacing is permitted because member 41 freely slides through sleeve 53.

To allow the plow and harrow sections to be raised in unison, the couplings 44 provide an additional necessary movement. By examining FIG. 3 it will be seen that transverse hinge pins 31 positively prevent any rotation of extension members 33 and 36 about their longitudinal axes with relation to their respective plow supporting frame members 24 and 27. However, during the raising in unison of the plow wing sections 17 and 18, and the harrow sections 30 and 32, from the positions shown in FIG. 2 to the positions shown in FIG. 4, there must necessarily be a change in relative angular positions between the sleeves 54 and their respective transverse frame members 41. This change in relative positions is clearly shown in FIG. 4, and is necessary because each plow wing section 17–18 moves through an arc of 90°, while each harrow section 30–32 simultaneously moves through an arc of only about 70°, depending on the offset distance between their respective pivot axes 22 and 52. The pivot pins 55 of the couplings 44 and 46 afford this necessary movement of sleeves 54.

In summary, the coupling 44 (FIG. 5) allows four different types of relative movement between members 33 and 41. The first is a sliding movement of member 41 in sleeve 53; the second involves sliding movement of member 33 in sleeve 54; the third is a partial rotation of member 33 about the axis of pin 55; and the fourth is rotation of member 33 about the axis of bolt 56. Coupling 46 (FIG. 6) allows three types of relative movement and is similar to coupling 44 except for the absence of free sliding movement of member 41 relative to the coupling 46.

Having described the invention with sufficient clarity to enable those familiar with the art to construct and use it, we claim:

1. A rotary spiked-tooth harrow attachment for use on a rigid frame sectional plow having a center frame section and foldable wing sections pivotally connected to each side of the center section with axes of rotation parallel to the line of draft of the plow, the attachment comprising:

two separate harrow sections (30 and 32) each having gound engaging wheels which are rotatably mounted on elongated transverse frame member (41), the two sections having an aggregate length substantially the same as the extended width of the sectional plow;

spaced inner and outer fore and aft disposed parallel extension members (34–33 and 35–36) attached to the plow frame and extending rearwardly therefrom for supporting each of the harrow sections, the inner extension members (34 and 35) being attached to the plow center section (14), while the outer extension members (33 and 36) are attached to the respective plow wing sections (17 and 18);

a first coupling means (46) connecting the inner portion of the frame member (41) of each harrow section to an inner extension member (34–35) and affording pivotal movement of each frame member (41) about its respective inner extension member (34–35) on a fore and aft horizontal axis (52) parallel to but offset transversely from the axes of rotation (22) of the plow wing sections; and second coupling means (44) connecting the outer portion of the frame member (41) of each harrow section to the respective outer extension members (33 and 36), and affording sliding movement of the frame members (41) through the respective second couplings, and also affording pivotal movement between the frame members (41) and the outer extension members (33 and 36) about fore and aft axes (55), whereby the plow wing sections (17 and 18) and harrow sections (30 and 32) are coupled for synchronized rotation about their respective axes even though their axes are not coaxial.

2. A rotary spiked-tooth harrow attachment as set forth in claim 1 wherein the first coupling means (46) includes a sleeve (51) which affords fore and aft adjustable positioning of the couplings on the respective inner extension members (34 and 35); and a pivot axis (49) affording angular adjustment of each frame member (41) of each harrow section with respect to its extension member (34 or 35); and in which each second coupling means (44) includes a sleeve (54) which is slidably adjustable along its outer extension member (33 or 36); and a pivot axis (56) which affords angular adjustment of each frame member (41) with respect to its outer extension member (33 or 36).

3. A rotary spiked-tooth harrow attachment as set forth in claim 1 wherein each of the extension members are pivotally attached to the plow frame for limited movement in vertical planes parallel to the line of draft of the plow; and spring biasing means urging the extension members (33–36) to pivot downward, to consequently urge the harrow sections (30–32) downward into engagement with the ground.

4. A ground working implement for attachement in trailed relationship to a draft implement, which draft implement includes:
 (a) a rigid elongated horizontal main frame (14) disposed transversely with relation to the line of draft;
 (b) a similarly disposed rigid elongated normally horizontal frame section (17) pivotally connected at its inner end to one end of said main frame on a fore and aft disposed axis (22) for movement from a horizontal position into a raised or retracted position substantailly perpendicular to said main frame;
 (c) a first elongated draft member (25 and 34) secured to and extending aft from said main frame along the line of draft, and offset with respect to the fore and aft pivot axis (22) of the frame section (17); and
 (d) a second elongated draft member (24 and 33) secured to and extending aft from the outer free end of the pivoted frame section (17), generally along the line of draft;

said ground working implement comprising:
 an elongated rigid implement frame member (41) disposed transverse to the line of draft and aft of the draft implement frame (14) and frame section (17);
 a first coupling (46) pivotally connecting the implement frame member (41) near its inner end to the first draft member near its aft end on a fore and aft disposed pivot axis (52) which is offset transversely with respect to the pivot axis of the draft implement frame section (17);
 and a second coupling (44) pivotally connecting the implement frame member (41) near its outer end to said second draft member (24 and 33) near its aft end on a fore and aft disposed axis (55), said coupling also providing free transverse sliding movement of the implement frame member (41) along its longitudinal axis with respect to the fore and aft disposed second draft member (24 and 33), to compensate for the transverse offset distance between the respective axes (22 and 52) of the draft implement frame section (17) and the trailed implement frame member (41) when the two are raised in unison.

References Cited

UNITED STATES PATENTS

| | | | |
|---|---|---|---|
| 500,349 | 6/1893 | Pridmore | 172—177 |
| 598,820 | 2/1898 | Sharp | 172—178 XR |
| 840,839 | 1/1907 | Germon | 172—632 XR |
| 1,227,926 | 5/1917 | Parker | 172—623 XR |
| 1,545,564 | 7/1925 | Krotz | 172—179 |
| 2,255,562 | 9/1941 | Harvey | 172—177 |
| 2,286,619 | 6/1942 | Hokanson | 172—662 XR |
| 2,559,002 | 7/1951 | Brock | 172—623 XR |
| 2,599,251 | 6/1952 | Garrett | 172—662 XR |
| 2,613,581 | 10/1952 | Pretzer | 172—140 |
| 2,943,692 | 7/1960 | Hyland et al. | 172—195 XR |
| 2,966,217 | 12/1960 | Padrick | 172—137 |
| 2,974,738 | 3/1961 | Walberg | 172—662 XR |

FOREIGN PATENTS

| | | |
|---|---|---|
| 435,677 | 5/1948 | Italy. |
| 584,580 | 10/1958 | Italy. |

EDGAR S. BURR, Primary Examiner.

U.S. Cl. X.R.

172—776, 195, 613, 623, 629, 662